Feb. 10, 1931.  P. B. REEVES  1,792,242
VARIABLE SPEED UNIT
Filed March 8, 1930
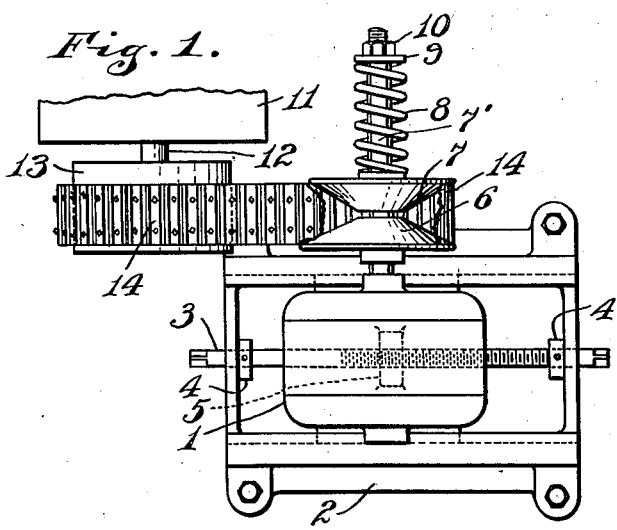
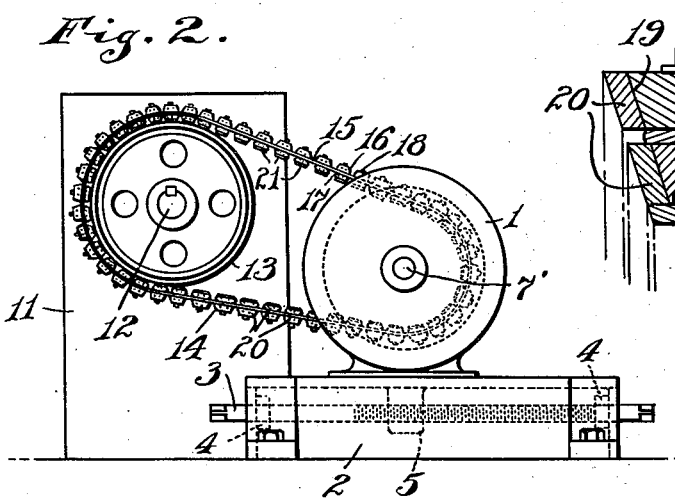
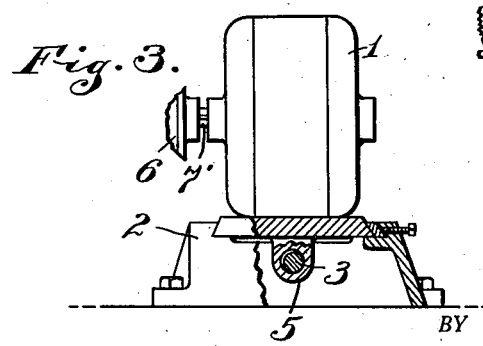
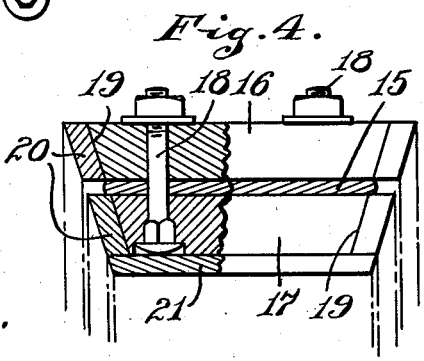
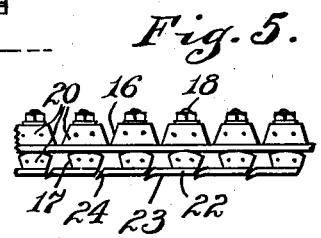
INVENTOR.
Paul B. Reeves,
BY Hood + Hahn.
ATTORNEYS Patented Feb. 10, 1931

1,792,242

UNITED STATES PATENT OFFICE

PAUL B. REEVES, OF COLUMBUS, INDIANA, ASSIGNOR TO REEVES PULLEY COMPANY, OF COLUMBUS, INDIANA, A CORPORATION OF INDIANA

VARIABLE-SPEED UNIT

Application filed March 8, 1930. Serial No. 434,474.

My invention relates to improvements in speed varying transmissions and has for one of its objects the provision of a speed control unit which will provide for a wider range of speed variation with a minimum of parts.

For the purpose of disclosing my invention, I have illustrated one embodiment thereof in the accompanying drawings, in which:

Fig. 1 is a plan view of a transmission embodying my invention;

Fig. 2 is a side elevation thereof;

Fig. 3 is an end elevation partially in section;

Fig. 4 is a sectional view of a driving belt for my transmission; and

Fig. 5 is a side elevation of a modified form of belt.

In the embodiment illustrated, the source of power is shown as an electric motor 1 which is slidably mounted on a base 2, the motor may be mounted on gibs or other suitable guide rails on the base 2 and is moved to its adjusted position by means of an adjusting screw 3 held against longitudinal movement by collars 4 surrounding the same and abutting the end walls of the base. This screw 3 is threaded through a boss 5 on the bottom of the gib on which the motor is mounted so that the turning of the screw will adjust the motor longitudinally on its base.

The motor shaft has mounted thereon a pair of cone discs 6 and 7, the disc 6 being rigidly mounted on the shaft and the disc 7 being splined thereon so that, while it rotates with the shaft it may move relatively to the disc 6. The disc 7 is biased toward the disc 6 by means of a coil compression spring 8 surrounding the shaft and held against longitudinal movement in one direction on the shaft by a collar 9 and an adjustable nut 10.

The driven element 11 has the shaft 12 thereon provided with a flat faced pulley 13 and this pulley is driven from the cone pulleys 7 and 6 by a belt 14. The face of the belt contacting with the straight faced pulley 13 is narrower than the straight faced pulley. This difference in width of the pulley and the contacting face of the belt is at least equal to the distance that the pulley cone 7 may be displaced on the shaft 7'.

The belt 14 comprises an endless band member 15 which may be of fabric or other suitable material. Driving blocks spaced at regular intervals along the belt are secured to the upper and lower faces of this belt. The belt therefore is composed of comparatively thin medial web 15 having secured to its outer and inner faces pairs of rigid cross-bars or blocks 16 and 17. These blocks are secured to the belt by means of clamping bolts 18, which pass through the pairs of blocks and through the web, being counter sunk in the inner face of the inner block. The ends of the blocks are oppositely inclined as at 19 toward the inner face of the blocks to co-operate with the angles of the faces of the cone pairs 6—7. The inclined faces of the blocks are faced with friction material 20 which may be leather or other suitable material and which may be secured in any suitable manner to the faces of the blocks. The inner face of the inner block likewise has secured thereon friction material 21 which may be leather or other suitable friction material and which is adapted to contact with the straight face pulley 13, while the end faces of the blocks are adapted to contact with the faces of the cone pairs 6—7.

In Fig. 5, I have illustrated a modified form of belt. In this form the friction face 22 on the inner face of each of the inner blocks is extended as at 23 to overlap the next securing block the adjacent edges being chamfered as at 24 to make a smooth overlap.

The operation of the device is obvious with the parts in the position illustrated in Fig. 1. The pulley 13 is being driven at its maximum speed with the belt engaging the cones 6—7 at the highest point thereof. In order to increase the speed of the pulley 13 the power motor 1 is moved to shift the shaft 7' away from the shaft 12. Due to this movement and due to the fact that the belt is of a fixed length, as the discs 6—7 move away from the pulley 13, the belt will slide further down towards the center of the cones, the disc 7 moving along the shaft 7' to accommodate this shifting. It will be noted that the shafts 12 and 7' are in parallelism so that the relative shifting of the shafts will not have any tendency to distort the belt 14. Furthermore, due to the fact that the pitch line of the belt is disposed on a line centering the cross-sectional area of the belt there is no tendency on the part of the belt to weave or "wabble" on the cones during the driving thereof.

I claim the following:

1. A speed varying unit comprising in combination, a pair of parallel shafts, a pair of cones mounted on one of said shafts, one of said cones being relatively fixed and the other movable relative thereto, a straight faced pulley on the other shaft, a driving belt connecting said cones with said pulley comprising a comparatively thin flexible middle member, a plurality of pairs of transversely rigid blocks having aligned beveled faces secured on said middle member in such manner that the middle member passes medially between the blocks of each pair, friction elements secured to the inner faces of the inner series of blocks, friction elements attached to the beveled ends of the blocks, and means for varying the distance between the shafts to vary the effective pulley diameters of the cone pulley.

2. A speed varying power transmission unit comprising a pair of parallel shafts, means for adjusting said shafts relatively to one another to vary their center distances, a pair of cone discs mounted on one of said shafts, one of said discs being fixed thereto and the other being axially movable thereof, means for biasing the axially movable discs toward the other, a straight faced pulley mounted on the other shaft and a driving belt drivingly connecting said cones with said pulley, comprising a comparatively thin endless flexible middle member, a plurality of pairs of transversely rigid blocks having aligned beveled ends secured to said block in such a manner that the middle member passes between the blocks of each pair, friction elements attached to the beveled ends of the blocks and friction elements secured to the inner faces of the inner series of blocks.

In witness whereof, I, PAUL B. REEVES, have hereunto set my hand at Columbus, Indiana, this 28th day of February, A. D. one thousand nine hundred and thirty.

PAUL B. REEVES.